US012785551B2

(12) United States Patent
Huang et al.

(10) Patent No.: US 12,785,551 B2
(45) Date of Patent: Nov. 3, 2026

(54) NON-ISOLATED RESONANT CONVERTER AND DRIVING CIRCUIT THEREOF

(71) Applicant: Monolithic Power Systems, Inc., Kirkland, WA (US)

(72) Inventors: Daocheng Huang, Santa Clara, CA (US); Junjie Feng, San Jose, CA (US); Fengchun He, Hangzhou (CN); Xu Han, Hangzhou (CN)

(73) Assignee: Monolithic Power Systems, Inc., Kirkland, WA (US)

( * ) Notice: Subject to any disclaimer, the term of this patent is extended or adjusted under 35 U.S.C. 154(b) by 330 days.

(21) Appl. No.: 18/545,071

(22) Filed: Dec. 19, 2023

(65) Prior Publication Data

US 2025/0202350 A1 Jun. 19, 2025

(51) Int. Cl.
*H02M 3/00* (2006.01)
*H02M 1/088* (2006.01)
(Continued)

(52) U.S. Cl.
CPC ............. *H02M 3/01* (2021.05); *H02M 1/088* (2013.01); *H02M 3/157* (2013.01); *H02M 3/158* (2013.01)

(58) Field of Classification Search
CPC .......... H02M 3/01; H02M 3/015; H02M 3/02; H02M 3/04; H02M 3/06; H02M 3/07–078; H02M 3/135; H02M 3/137; H02M 3/155; H02M 3/1552; H02M 3/1555; H02M 3/156; H02M 3/157; H02M 3/158; H02M 3/1582; H02M 3/1584; H02M 3/1588; H02M 3/33507; H02M 3/33538; H02M 1/0006; H02M 1/0095; H02M 1/08; H02M 1/088; H02M 1/34–348; H02M 1/4241; H02M 1/0064; Y02B 70/10
(Continued)

(56) References Cited

U.S. PATENT DOCUMENTS 11,705,817 B2 7/2023 Fu
11,799,383 B2 10/2023 Fu
(Continued)

OTHER PUBLICATIONS

D. Huang et al., "Novel Non-isolated LLC Resonant Converters", IEEE, 2012, pp. 1373-1380. (Year: 2012).*
U.S. Appl. No. 17/410,083, filed Mar. 2, 2023, Dianbo Fu.

*Primary Examiner* — Thienvu V Tran
*Assistant Examiner* — Carlos O Rivera-Perez
(74) *Attorney, Agent, or Firm* — Ashurst Perkins Coie US LLP

(57) ABSTRACT

A non-isolated resonant switching converter has a transformer, a resonant tank, a first switching device coupled between an input node and the resonant tank, a second switching device coupled between the resonant tank and a secondary winding of the transformer, and a third switching device coupled between the secondary winding and the ground. The third switching device is driven by a first driver, the second switching device is driven by a second driver, and the first switching device is driven by a third driver. When the first and third switching devices are turned on and the second switching device is turned off, a first capacitor used to power the second driver is charged. When the first and third switching devices are turned off and the second switching device is turned on, a second capacitor used to power the third driver is charged by the first capacitor.

20 Claims, 7 Drawing Sheets

(51) Int. Cl.
*H02M 3/157* (2006.01)
*H02M 3/158* (2006.01)

(58) Field of Classification Search
USPC ........ 323/205, 207–211, 222–226, 247, 255, 323/259, 271–275, 282–285, 351; 363/15–21.3, 123, 124, 144, 146, 147
See application file for complete search history.

(56) References Cited

U.S. PATENT DOCUMENTS

| | | | | |
|---|---|---|---|---|
| 2022/0069705 | A1* | 3/2022 | Kim | H02M 1/0009 |
| 2022/0166324 | A1* | 5/2022 | Liu | H02M 3/07 |
| 2024/0405689 | A1* | 12/2024 | Yang | H02M 1/0054 |

* cited by examiner

NON-ISOLATED RESONANT CONVERTER AND DRIVING CIRCUIT THEREOF

BACKGROUND OF THE INVENTION

1. Field of the Invention

The present invention generally relates to electronic circuit, and more particularly but not exclusively relates to non-isolated resonant converter and its driving circuit.

2. Description of Related Art

A converter is an electrical circuit that converts an input voltage to an output voltage. The output voltage is lower than the input voltage in the case of a buck converter, whereas the output voltage is higher than the input voltage in the case of a boost converter. A resonant converter is a type of converter that converts a DC input voltage to a DC output voltage using a resonant tank circuit. A transformer may be employed to scale a voltage presented on the primary winding of the transformer. A conventional resonant converter includes a DC to AC (DC/AC) inverter that converts the DC input voltage to a square wave. The resonant tank circuit filters the harmonics of the square wave, resulting in a sinusoidal current that is provided to an AC to DC (AC/DC) rectifier by way of a transformer. The rectified output of the rectifier is filtered by an output capacitor to generate the DC output voltage.

SUMMARY OF THE INVENTION

It is one of the objects of the present invention to provide non-isolated resonant converter and associated driving circuit and driving method.

One embodiment of the present invention discloses a non-isolated resonant switching converter, having an input node to receive an input voltage, and an output node to provide an output voltage. The non-isolated resonant switching converter comprises a transformer, a resonant tank, a first switching device, a second switching device, a third switching device, a first driver integrated circuit (IC), and a second driver IC. The transformer has a primary winding and a secondary winding. The resonant tank comprises a resonant capacitor and a resonant inducor coupled in series between a first tank node and a second tank node, wherein the resonant inductor is formed by the primary winding. The first switching device is coupled between the input node and the first tank node. The second switching device is coupled between the first tank node and the secondary winding. The third switching device is coupled between the secondary winding and a reference ground. The first driver IC has a first driver and a second driver. The first driver is configured to provide a first driving signal based on a first control signal to drive the third switching device. The second driver is configured to provide a second driving signal based on a second control signal to drive the second switching device. The first driver is configured to be powered by a power supply and the second driver is configured to be powered by a voltage across a first boot capacitor. The second driver IC has a third driver configured to provide a third driving signal based on a third control signal to drive the first switching device, and the third driver is configured to be powered by a voltage across a second boot capacitor. When the third switching device and the first switching device are turned on and the second switching device is turned off, the first boot capacitor is charged by the power supply. When the third switching device and the first switching device are turned off and the second switching device is turned on, the second boot capacitor is charged by the first boot capacitor.

Another embodiment of the present invention discloses a driving circuit for driving a first switching device, a second switching device and a third switching device coupled in series between an input voltage and a reference ground. The first switching device is coupled to the input voltage, the third switching device is coupled to the reference ground, and the second switching device is coupled between the first switching device and the third switching device. The driving circuit comprises a first driver IC and a second driver IC. The first driver IC is configured to provide a first driving signal to drive the third switching device and a second driving signal to drive the second switching device. The first driver IC has a power supply pin configured to receive a power supply, a bootstrap pin, a first control input pin configured to receive a first control signal, a second control input pin configured to receive a second control signal, a first driving output pin configured to provide the first driving signal based on the first control signal, a second driving output pin configured to provide the second driving signal based on the second control signal, and a switching node pin coupled to a common node of the second switching device and the third switching device. A first boot capacitor is capable of coupling between the bootstap pin of the first driver IC and the switching node pin of the first driver IC. The second driver IC is configured to provide a third driving signal to drive the first switching device and a fourth driving signal to drive the third switching device together with the first driving signal. The second driver IC has a power supply pin configured to receive the power supply, a bootstrap pin, a first control input pin configured to receive the first control signal, a second control input pin configured to receive a third control signal, a first driving output pin configured to provide the fourth driving signal based on the first control signal, a second driving output pin configured to provide the third driving signal based on the third control signal, and a switching node pin coupled to a common node of the first switching device and the second switching device. A second boot capacitor is capable of coupling between the bootstap pin of the second driver IC and the switching node pin of the second driver IC.

Yet another embodiment of the present invention discloses a driving method for driving a first switching device, a second switching device and a third switching device coupled in series between an input voltage and a reference ground. The first switching device is coupled to the input voltage, the third switching device is coupled to the reference ground, and the second switching device is coupled between the first switching device and the third switching device. The driving method comprises receiving a first control signal and providing a first driving signal to drive the third switching device via a first driver. Powering the first driver by a power supply. Receiving a second control signal and providing a second driving signal to drive the second switching device via a second driver. Powering the second driver by a voltage across a first boot capacitor. Receiving a third control signal and providing a third driving signal to drive the first switching device via a third driver. Powering the third driver by a voltage across a second boot capacitor. When the third switching device and the first switching device are turned on and when the second switching device is turned off, charging the first boot capacitor by the power supply. When the third switching device and the first switching device are turned off and when the second switching device is turned on, charging the second boot capacitor by the first boot capacitor.

These and other features of the present invention will be readily apparent to persons of ordinary skill in the art upon reading the entirety of this disclosure, which includes the accompanying drawings and claims.

BRIEF DESCRIPTION OF DRAWINGS

The present invention can be further understood with reference to the following detailed description and the appended drawings, wherein like elements are provided with like reference numerals.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
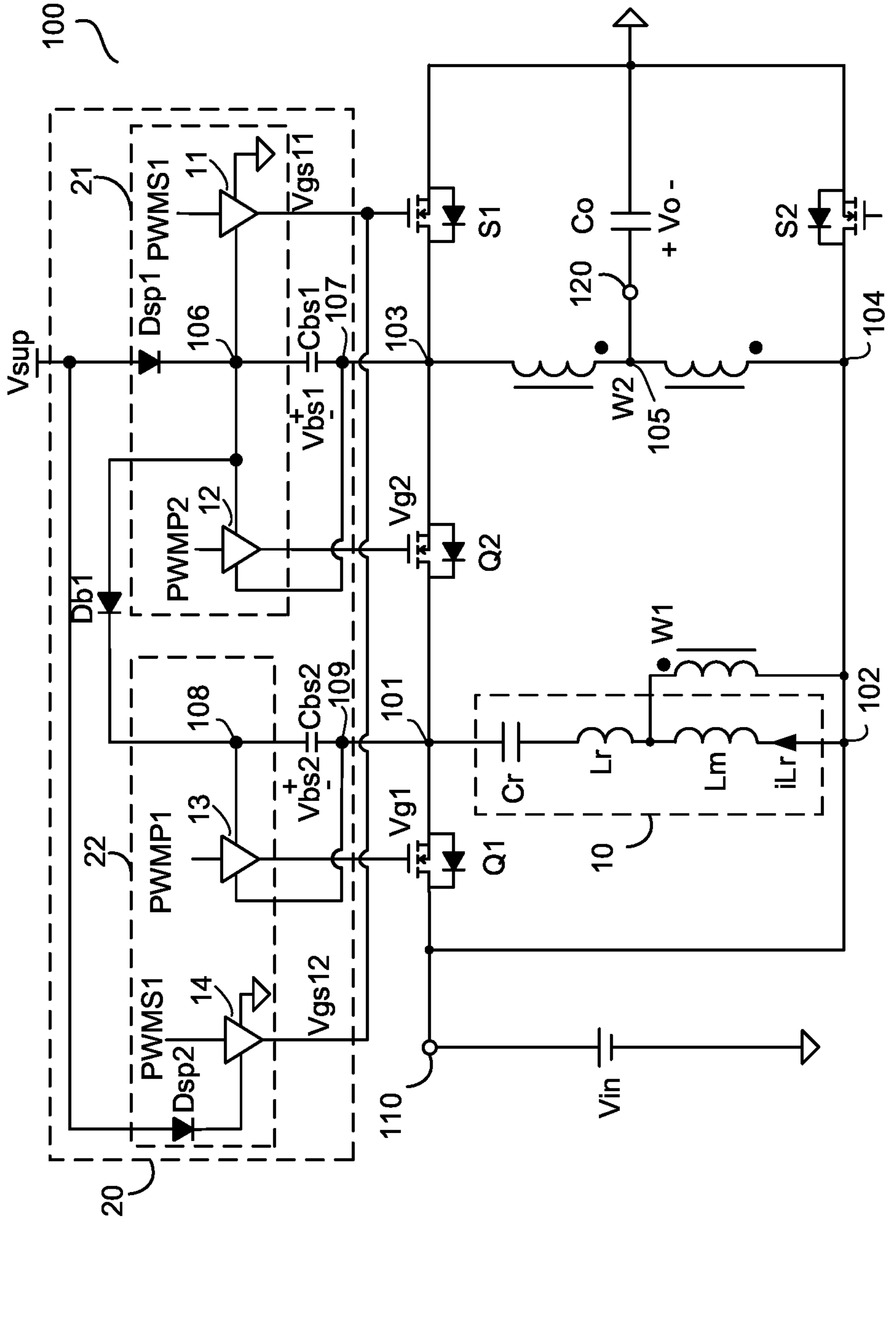
FIG. 1 schematically illustrates a non-isolated resonant switching converter 100 in accordance with an embodiment of the present invention.

FIG. 1 schematically illustrates a non-isolated resonant switching converter 100 in accordance with an embodiment of the present invention. The non-isolated resonant switching converter 100 has an input node 110 to receive an input voltage Vin, an output node 120 to provide an output voltage Vo. The non-isolated resonant switching converter 100 comprises a transformer having a primary winding W1 and a secondary winding W2, a resonant tank 10 having a resonant capacitor Cr and a resonant inductor Lr coupled in series between a tank node 101 and a tank node 102, switching devices Q1, Q2, S1 coupled in series between the input node 110 and a reference ground, and a driving circuit 20 configured to drive the switching devices Q1, Q2, and S1. In one embodiment, switching devices Q1, Q2 and S1 may comprise metal oxide semiconductor field effect transistor (MOSFET), junction field effect transistor (JFET), laterally diffused metal oxide semiconductor (LDMOS), and other suitable transistor.

The primary winding W1 could be simplified to a magnetizing inductor Lm and a leakage inductor in series, the leakage inductor acts as the resonant inductor Lr. In the example shown in FIG. 1, the resonant capacitor Cr has a first terminal coupled to the tank node 101 and a second terminal coupled to a first terminal of the resonant inductor Lr. A second terminal of the resonant inductor Lr is coupled to the tank node 102 through the magnetizing inductor Lm. One with ordinary skill in the art should also understand that detailed circuit structure of the resonant tank 10 is not limited by the embodiment shown in FIG. 1, but could also comprise other suitable circuit structure without detracting from merits of the present invention.

The switching device Q1 is coupled between the input node 110 and the tank node 101, the switching device Q2 is coupled between the tank node 101 and the secondary winding W2, and the switching device S1 is coupled between the secondary winding W2 and the reference ground. In the example shown in FIG. 1, the secondary winding W2 has a terminal 103, a terminal 104, and a center tap 105. In one embodiment, the terminal 103 is coupled to a common node of the switching device Q2 and the switching device S1, and the center tap 105 is coupled to the output node 120 to provide the output voltage Vo. In one embodiment, a switching device S2 is employed to coupled between the terminal 104 and the reference ground. The switching device S2 may comprise metal oxide semiconductor field effect transistor (MOSFET), junction field effect transistor (JFET), laterally diffused metal oxide semiconductor (LDMOS), and other suitable transistor. One with ordinary skill in the art should understand that the detailed connection of the switching devices Q1, Q2, S1, S2, the resonant tank 10, the primary winding W1 and the secondary winding W2 of the transformer are not limited by the embodiment shown in FIG. 1, but could also comprise other suitable connection without detracting from merits of the present invention.

The driving circuit 20 is configured to drive the switching devices Q1, Q2 and S1 based on control signals PWMS1, PWMP1, and PWMP2. The driving circuit 20 has drivers 11-13. In one embodiment, the drivers 11 and 12 are integrated on a driver integrated circuit (IC) 21, and the driver 13 is integrated on a driver IC 22. The driver 11 receives the control signal PWMS1, and provides a driving signal Vgs11 based on the control signal PWMS1. The driver 11 is powered by a power supply Vsup via a switch Dsp1. In one embodiment, the switch Dsp1 is a diode, and an anode of the diode Dsp1 is coupled to the power supply Vsup, and a cathode of the diode Dsp1 is coupled to the driver 11. In another embodiment, the switch Dsp1 is a field effect transistor (FET). The driver 12 receives the control signal PWMP2, and provides a driving signal Vg2 based on the control signal PWMP2. The driver 12 is powered by a voltage Vbs1 across a boot capacitor Cbs1. The boot capacitor Cbs1 may be positioned out of the driver IC 21, or may be integrated on the driver IC 21. In one embodiment, the boot capacitor Cbs1 has a terminal 106 coupled to the cathode of the diode Dsp1, and a terminal 107 coupled to a common node of the switching device Q2 and the switching device S1. The driver 13 receives the control signal PWMP1, and provides a driving signal Vg1 based on the control signal PWMP1. The driver 13 is powered by a voltage Vbs2 across a boot capacitor Cbs2. The boot capacitor Cbs2 may be positioned out of the driver IC 22, or may be integrated on the driver IC 22. In one embodiment, the boot capacitor Cbs2 has a terminal 108 coupled to the terminal 106 of the boot capacitor Cbs1 via a boot diode Db1, and a terminal 109 coupled to a common node of the switching device Q1 and the switching device Q2. An anode of the boot diode Db1 is coupled to the terminal 106 of the boot capacitor Cbs1, and a cathode of the boot diode Db1 is coupled to the terminal 108 of the boot capacitor Cbs2. The switching device S1 is derived by the driving signals Vgs11, the switching device Q2 is derived by the driving signal Vg2, and the switching device Q1 is derived by the driving signal Vg1.

In one embodiment, when the switching device S1 is turned on, the boot capacitor Cbs1 is charged by the power supply Vsup. For example, a current flowing through the power supply Vsup, the diode Dsp1, the boot capacitor Cbs1, the switching device S1 and the reference ground is used to charge the boot capacitor Cbs1. In one embodiment, when the switching device Q2 is turned on, the boot capacitor Cbs2 is charged by the boot capacitor Cbs1. For example, a current flowing from the terminal 106 of the boot capacitor Cbs1, the boot diode Db1, the boot capacitor Cbs2, and the switching device Q2, to the terminal 107 of the boot capacitor Cbs1 is used to charge the boot capacitor Cbs2. In one embodiment, the switching devices S1 and Q1 are turned on and turned off at the same time, and the switching device Q2 is turn on interleaved with the switching devices S1 and Q1. However, one with ordinary skill in the art should also understand that a delay may exist between turning on of the switching device Q1 and turning on of the switching device S1, and a delay may exist between turning off of the switching device Q1 and turning off of the switching device S1. In one embodiment, a maximum voltage of the driving signal Vgs11 is higher than a maximum voltage of the driving signal Vg2, and the maximum voltage of the driving signal Vg2 is higher than a maximum voltage of the driving signal Vg1.

In one embodiment, the switching device S1 may comprise more than one transistors coupled in parallel, such that large current can be handled. The driving circuit 20 further comprises a driver 14 which is integrated on the driver IC 22. The driver 14 receives the control signal PWMS1, and provides a driving signal Vgs12 based on the control signal PWMS1. The driver 14 is powered by the power supply Vsup via a switch Dsp2. In one embodiment, the switch Dsp2 is a diode, an anode of the diode Dsp2 is coupled to the power supply Vsup, and a cathode of the diode Dsp2 is coupled to the driver 14. The switching device S1 is derived by the driving signals Vgs11 and Vgs12. In one embodiment, a maximum voltage of the driving signal Vgs12 is higher than the maximum voltage of the driving signal Vg2. Embodiments of the present invention could provide more than one driving signals to drive the switching device S1. In one embodiment, the drivers 11-12 may be integrated on an integrated circuit (IC), and the drivers 13-14 may be integrated on another IC. In another embodiment, the drivers 11-14 may be integrated on a single IC.

Figure 2:
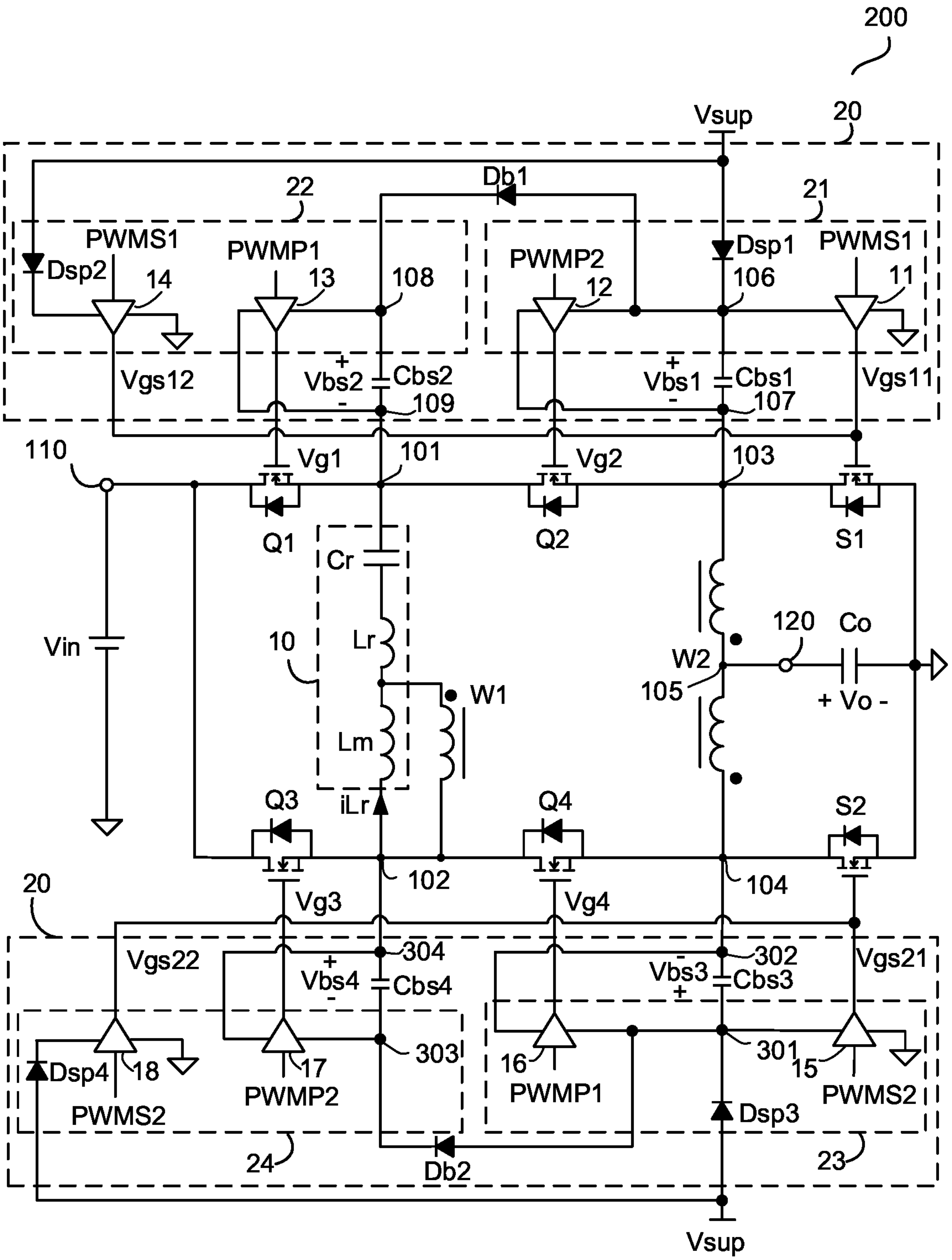
FIG. 2 schematically illustrates a non-isolated resonant switching converter 200 in accordance with an embodiment of the present invention.

FIG. 2 schematically illustrates a non-isolated resonant switching converter 200 in accordance with an embodiment of the present invention. As shown in FIG. 2, the non-isolated resonant switching converter 200 further comprises a switching devices Q3 and Q4. The switching device Q3 is coupled between the input node 110 and the tank node 102, the switching device Q4 is coupled between the tank node 102 and the secondary winding W2. In one embodiment, the terminal 104 of the secondary winding W2 is coupled to a common node of the switching device Q4 and the switching device S2. The switching devices Q3 and Q4 may comprise metal oxide semiconductor field effect transistor (MOSFET), junction field effect transistor (JFET), laterally diffused metal oxide semiconductor (LDMOS), and other suitable transistor.

The driving circuit 20 further comprises drivers 15-17. In one embodiment, the drivers 15 and 16 are integrated on a driver IC 23, and the driver 17 is integrated on a driver IC 24. The driver 15 receives a control signal PWMS2, and provides a driving signal Vgs21 based on the control signal PWMS2. The driver 15 is powered by the power supply Vsup via a switch Dsp3. In one embodiment, the switch Dsp3 is a diode, and an anode of the diode Dsp3 is coupled to the power supply Vsup, and a cathode of the diode Dsp3 is coupled to the driver 15. The driver 16 receives the control signal PWMP1, and provides a driving signal Vg4 based on the control signal PWMP1. The driver 16 is powered by a voltage Vbs3 across a boot capacitor Cbs3. The boot capacitor Cbs3 may be positioned out of the driver IC 23, or may be integrated on the driver IC 23. In one embodiment, the boot capacitor Cbs3 has a terminal 301 coupled to the cathode of the diode Dsp3, and a terminal 302 coupled to a common node of the switching device Q4 and the switching device S2. The driver 17 receives the control signal PWMP2, and provides a driving signal Vg3 based on the control signal PWMP2. The driver 17 is powered by a voltage Vbs4 across a boot capacitor Cbs4. The boot capacitor Cbs4 may be positioned out of the driver IC 24, or may be integrated on the driver IC 24. In one embodiment, the boot capacitor Cbs4 has a terminal 303 coupled to the terminal 301 of the boot capacitor Cbs3 via a boot diode Db2, and a terminal 304 coupled to a common node of the switching device Q3 and the switching device Q4. An anode of the boot diode Db2 is coupled to the terminal 301 of the boot capacitor Cbs3, and a cathode of the boot diode Db2 is coupled to the terminal 303 of the boot capacitor Cbs2. The switching device S2 is derived by the driving signal Vgs21. The switching device Q4 is derived by the driving signal Vg4 based on the control signal PWMP1, such that the switching device Q4 is expected to be turned on and off at the same time with the switching device Q1. The switching device Q3 is derived by the driving signal Vg3 based on the control signal PWMP2, such that the switching device Q3 is expected to be turned on and off at the same time with the switching device Q2.

In one embodiment, when the switching device S2 is turned on, the boot capacitor Cbs3 is charged by the power supply Vsup. For example, a current flowing through the power supply Vsup, the diode Dsp3, the boot capacitor Cbs3, the switching device S2 and the reference ground is used to charge the boot capacitor Cbs2. In one embodiment, when the switching device Q4 is turned on, the boot capacitor Cbs4 is charged by the boot capacitor Cbs3. For example, a current flowing from the terminal 301 of the boot capacitor Cbs3, the boot diode Db2, the boot capacitor Cbs4, and the switching device Q4, to the terminal 302 of the boot capacitor Cbs2 is used to charge the boot capacitor Cbs3. In one embodiment, the switching devices S2 and Q3 are turned on and turned off at the same time, and the switching device Q4 is turned on interleaved with the switching devices S2 and Q3. However, one with ordinary skill in the art should also understand that a delay may exist between turning on of the switching device Q3 and turning on of the switching device S2, and a delay may exist between turning off of the switching device Q3 and turning off of the switching device S2. In one embodiment, a maximum voltage of the driving signal Vgs21 is higher than a maximum voltage of the driving signal Vg4, and the maximum voltage of the driving signal Vg4 is higher than a maximum voltage of the driving signal Vg3.

In one embodiment, the switching device S2 may comprise more than one transistors coupled in parallel, such that large current can be handled. The driving circuit 20 further comprises a driver 18 which is integrated on the driver IC 24. The driver 18 receives the control signal PWMS2, and provides a driving signal Vgs22 based on the control signal PWMS2. The driver 18 is powered by the power supply Vsup via a switch Dsp4. In one embodiment, the switch Dsp4 is a diode, an anode of the diode Dsp4 is coupled to the power supply Vsup, and a cathode of the diode Dsp4 is coupled to the driver 18. The switching device S2 is derived by the driving signals Vgs21 and Vgs22. In one embodiment, a maximum voltage of the driving signal Vgs22 is higher than the maximum voltage of the driving signal Vg4. Embodiments of the present invention could provide more than one driving signals to drive the switching device S2. In one embodiment, the drivers 15-16 may be integrated on an integrated circuit (IC), and the drivers 17-18 may be integrated on another IC. In another embodiment, the drivers 15-18 may be integrated on a single IC.

Figure 3:
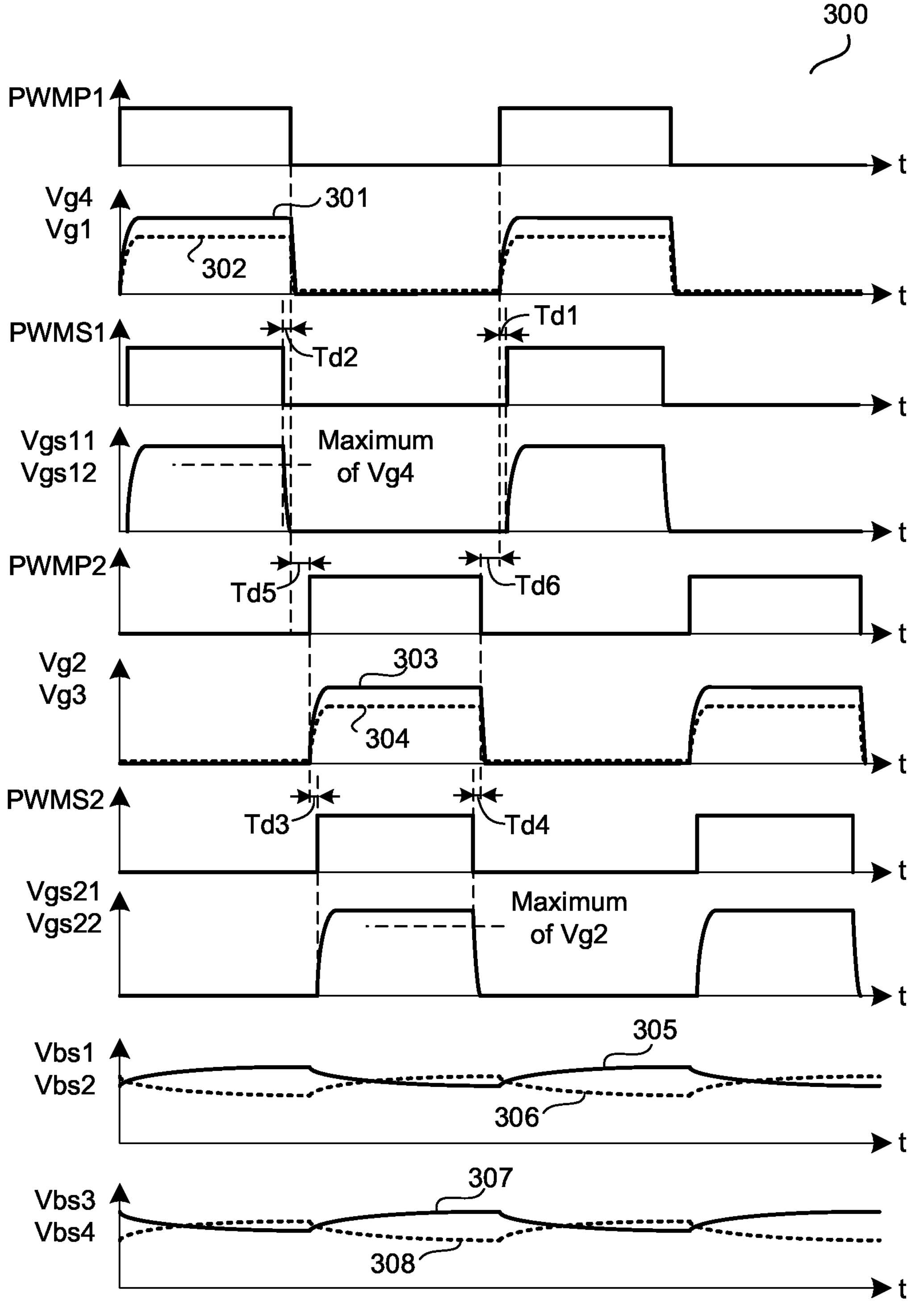
FIG. 3 illustrates a timing diagram 300 of the non-isolated resonant switching converter 200 shown in FIG. 2 in accordance with an embodiment of the present invention.

FIG. 3 illustrates a timing diagram 300 of the non-isolated resonant switching converter 200 shown in FIG. 2 in accordance with an embodiment of the present invention. From top to below, the timing diagram 300 shows the control signal PWMP1, the driving signals Vg4 (shown as a curve 301) and Vg1 (shown as a curve 302 with dotted line), the control signal PWMS1, the driving signals Vgs11 and Vgs12, the control signal PWMP2, the driving signals Vg2 (shown as a curve 303) and Vg3 (shown as a curve 304 with dotted line), the control signal PWMS2, the driving signals Vgs21 and Vgs22, the voltage Vbs1 (shown as a curve 305) across the boot capacitor Cbs1, the voltage Vbs2 (shown as a curve 306 with dotted line) across the boot capacitor Cbs2, the voltage Vbs3 (shown as a curve 307) across the boot capacitor Cbs3, and the voltage Vbs4 (shown as a curve 308 with dotted line) across the boot capacitor Cbs4.

Referring FIG. 3, when the control signal PWMP1 becomes logic high, the switching devices Q1 and Q4 are turned on by the driving signals Vg1 and Vg4 respectively. When the control signal PWMS1 becomes logic high, the switching device S1 is turned on by the driving signals Vgs11 and Vgs12. When the control signal PWMP2 becomes logic high, the switching devices Q2 and Q3 are turned on by the driving signals Vg2 and Vg3. When the control signal PWMS2 becomes logic high, the switching device S2 is turned on by the driving signals Vgs21 and Vgs22.

In one embodiment, when the control signals PWMP1 and PWMS1 are logic high and the control signals PWMP2 and PWMS2 are logic low, the switching devices Q1, S1, Q4 are turned on, the switching devices Q2, Q3, S2 are turned off, such that the boot capacitors Cbs1 and Cbs4 are charged and the voltages Vbs1 and Vbs4 increase, and the boot capacitors Cbs2 and Cbs3 are discharged and the voltages Vbs2 and Vbs3 decrease. In one embodiment, when the control signals PWMP1 and PWMS1 are logic low and the control signals PWMP2 and PWMS2 are logic high, the switching devices Q1, S1, Q4 are turned off, the switching devices Q2, Q3, S2 are turned on, such that the boot capacitors Cbs2 and Cbs3 are charged and the voltages Vbs2 and Vbs3 increase, and the boot capacitors Cbs1 and Cbs4 are discharged and the voltages Vbs1 and Vbs4 decreases.

In the embodiment of FIG. 3, a delay Td1 exists between turning on the switching devices Q1, Q4 and turning on the switching device S1, a delay Td2 exists between turning off the switching device S1 and turning off the switching devices Q1 and Q4, a delay Td3 exists between turning on the switching devices Q2, Q3 and turning on the switching device S2, a delay Td4 exists between turning off the switching device S2 and turning off the switching devices Q2, Q3, a delay Td5 exists between turning off the switching devices Q1, Q4 and turning on the switching devices Q2, Q3, and a delay Td6 exits between turning off the switching devices Q2, Q3 and turning on the switching devices Q1, Q4. In one embodiment, maximum voltages of the driving signals Vg4 and Vg2 are at the same level, maximum voltages of the driving signals Vg1 and Vg3 are at the same level, and maximum voltages of the driving signals Vgs11, Vgs12, Vgs21, and Vgs22 are at the same level. As shown in FIG. 3. the maximum voltage of the driving signal Vg1 is lower than the maximum voltage of the driving signal Vg4, the maximum voltage of the driving signal Vg4 is lower than the maximum voltage of the driving signals Vgs11 and Vgs12, the maximum voltage of the driving signal Vg3 is lower than the maximum voltage of the driving signal Vg2, and the maximum voltage of the driving signal Vg2 is lower than the maximum voltage of the driving signals Vgs21 and Vgs22.

Figure 4:
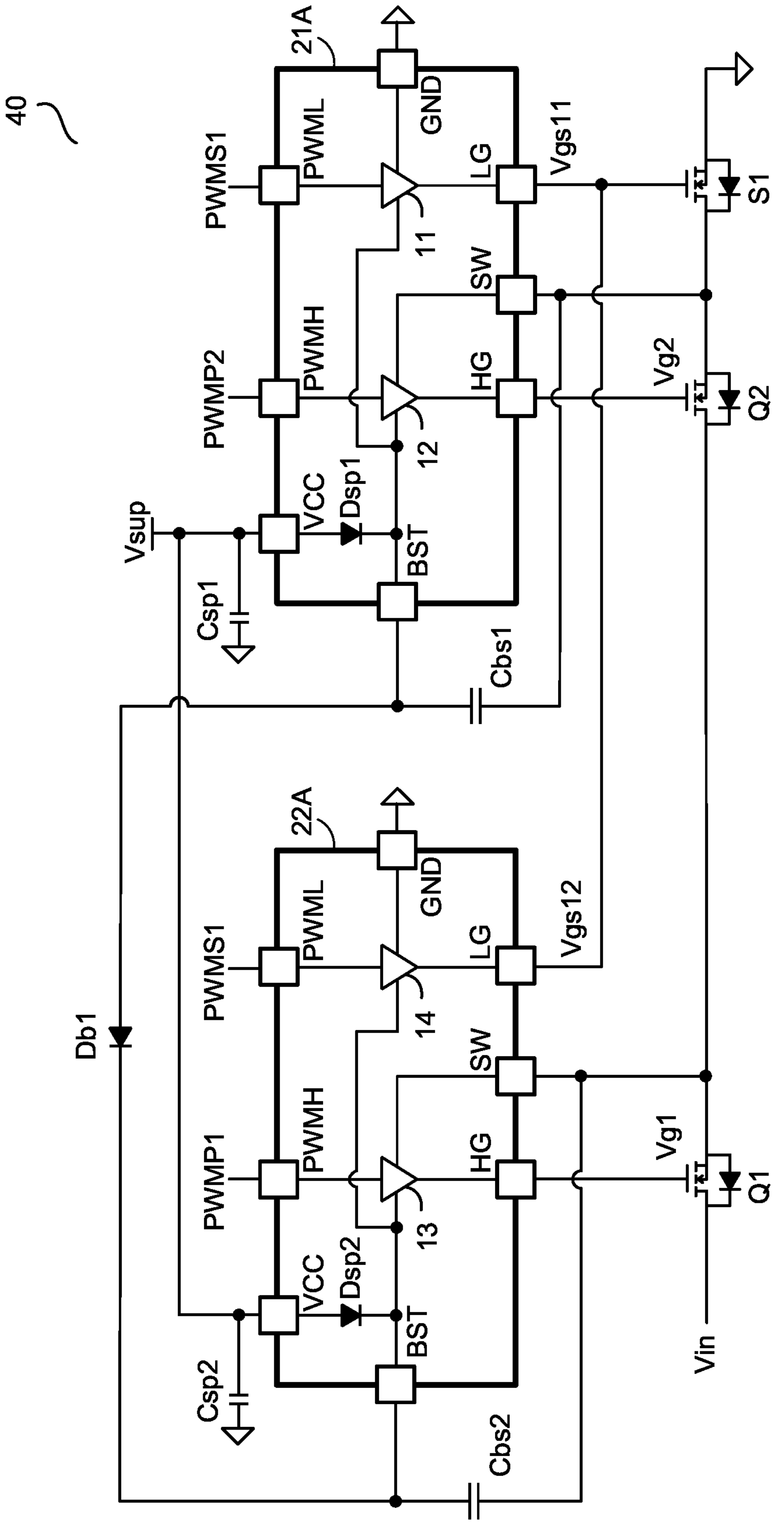
FIG. 4 schematically illustrates a driving circuit 40 in accordance with an embodiment of the present invention.

FIG. 4 schematically illustrates a driving circuit 40 in accordance with an embodiment of the present invention. The driving circuit 40 comprises a driver IC 21A and a driver IC 22A, to drive switching devices Q1, Q2, and S1 which are coupled in series between the input voltage Vin and the reference ground as shown in FIG. 2.

Each of the driver ICs 21A and 22A has a power supply pin VCC to receive the power supply Vsup, a bootstrap pin BST, a control input pin PWMH, a control input pin PWML, a driving output pin HG, a driving output pin LG, a switching node pin SW, and a reference ground pin GND coupled to the reference ground. The driver IC 21A has the driver 11 and the driver 12. The driver 11 is coupled to the control input pin PWML of the driver IC 21A to receive the control signal PWMS1, and coupled to the driving output pin LG of the driver IC 21A to provide the driving signal Vgs11. The driver 12 is coupled to the control input pin PWMH of the driver IC 21A to receive the control signal PWMP2, and coupled to the driving output pin HG of the driver IC 21A to provide the driving signal Vg2. The driver IC 22A has the driver 13 and the driver 14. The driver 13 is coupled to the control input pin PWMH of the driver IC 22A to receive the control signal PWMP1, and coupled to the driving output pin HG of the driver IC 22A to provide the driving signal Vg1. The driver 14 is coupled to the control input pin PWML of the driver IC 22A to receive the control signal PWMS1, and coupled to the driving output pin LG of the driver IC 22A to provide the driving signal Vgs12. The driver IC 21A has the diode Dsp1 coupled between the power supply pin VCC and the bootstrap pin BST, that is the anode of the diode Dsp1 is coupled to the power supply pin VCC of the driver IC 21A, and the cathode of the diode Dsp1 is coupled to the bootstrap pin BST of the driver IC 21A. The driver IC 22A has the diode Dsp2 coupled between the power supply pin VCC and the bootstrap pin BST, that is the anode of the diode Dsp2 is coupled to the power supply pin VCC of the driver IC 22A, and the cathode of the diode Dsp2 is coupled to the bootstrap pin BST of the driver IC 22A. The switching node pin SW of the driver IC 21A is coupled to the common node of the switching device S1 and the switching device Q2. The switching node pin SW of the driver IC 22A is coupled to the common node of the switching device Q1 and the switching device Q2.

Continuing refers FIG. 4, the boot capacitor Cbs1 is coupled between the bootstrap pin BST and the switching node pin SW of the driver IC 21A, and the boot capacitor Cbs2 is coupled between the bootstrap pin BST and the switching node pin SW of the driver IC 22A. The anode of the boot diode Db1 is coupled to the bootstrap pin BST of the driver IC 21A, and the cathode of the boot diode Db1 is coupled to the bootstrap pin BST of the driver IC 22A. When the switching devices S1 and Q1 are turned on and the switching device Q2 is turned off, the boot capacitor Cbs1 is charged by the power supply Vsup via the diode Dsp1 of the driver IC 21A, and when the switching device Q2 is turned on and the switching devices S1 and Q1 are turned off, the boot capacitor Cbs2 is charged by the boot capacitor Cbs1 via the boot diode Db1. In one embodiment, a capacitor Csp1 is coupled between the power supply pin VCC of the driver 21A and the reference ground, a capacitor Csp2 is coupled between the power supply pin VCC of the driver 22A and the reference ground. In one embodiment, a capacitance of the capacitor Csp1 is larger than the capacitance of the boot capacitor Cbs1, and the capacitance of the boot capacitor Cbs1 is larger than a capacitance of the boot capacitor Cbs2.

Figure 5:
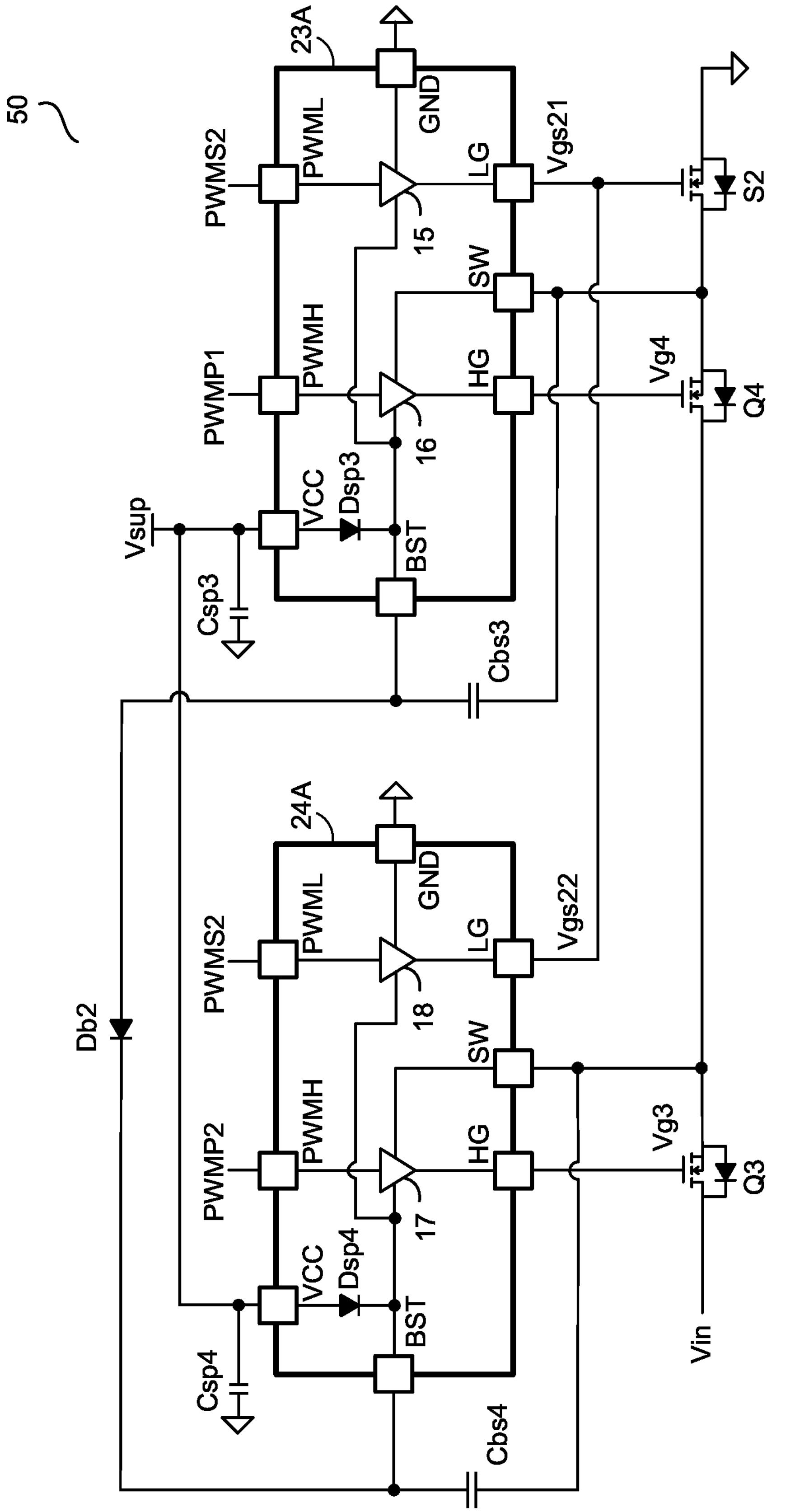
FIG. 5 schematically illustrates a driving circuit 50 in accordance with an embodiment of the present invention.

FIG. 5 schematically illustrates a driving circuit 50 in accordance with an embodiment of the present invention. The driving circuit 50 comprises a driver IC 23A and a driver IC 24A, to drive switching devices Q3, Q4, and S2 which are coupled in series between the input voltage Vin and the reference ground as shown in FIG. 2.

Each of the driver ICs 23A and 24A has the power supply pin VCC to receive the power supply Vsup, the bootstrap pin BST, the control input pin PWMH, the control input pin PWML, the driving output pin HG, the driving output pin LG, the switching node pin SW, and the reference ground pin GND coupled to the reference ground. The driver IC 23A has the driver 15 and the driver 16. The driver 15 is coupled to the control input pin PWML of the driver IC 23A to receive the control signal PWMS2, and coupled to the driving output pin LG of the driver IC 23A to provide the driving signal Vgs21. The driver 16 is coupled to the control input pin PWMH of the driver IC 23A to receive the control signal PWMP1, and coupled to the driving output pin HG of the driver IC 23A to provide the driving signal Vg4. The driver IC 24A has the driver 17 and the driver 18. The driver 17 is coupled to the control input pin PWMH of the driver IC 24A to receive the control signal PWMP2, and coupled to the driving output pin HG of the driver IC 24A to provide the driving signal Vg3. The driver 18 is coupled to the control input pin PWML of the driver IC 24A to receive the control signal PWMS2, and coupled to the driving output pin LG of the driver IC 24A to provide the driving signal Vgs22. The driver IC 23A has the diode Dsp3 coupled between the power supply pin VCC and the bootstrap pin BST, that is the anode of the diode Dsp3 is coupled to the power supply pin VCC of the driver IC 23A, and the cathode of the diode Dsp3 is coupled to the bootstrap pin BST of the driver IC 23A. The driver IC 24A has the diode Dsp4 coupled between the power supply pin VCC and the bootstrap pin BST, that is the anode of the diode Dsp4 is coupled to the power supply pin VCC of the driver IC 24A, and the cathode of the diode Dsp4 is coupled to the bootstrap pin BST of the driver IC 24A. The switching node pin SW of the driver IC 23A is coupled to the common node of the switching device S2 and the switching device Q4. The switching node pin SW of the driver IC 24A is coupled to the common node of the switching device Q3 and the switching device Q4.

Continuing refers FIG. 5, the boot capacitor Cbs3 is coupled between the bootstrap pin BST and the switching node pin SW of the driver IC 23A, and the boot capacitor Cbs4 is coupled between the bootstrap pin BST and the switching node pin SW of the driver IC 24A. The anode of the boot diode Db2 is coupled to the bootstrap pin BST of the driver IC 23A, and the cathode of the boot diode Db2 is coupled to the bootstrap pin BST of the driver IC 24A. When the switching devices S2 and Q3 are turned on and the switching device Q4 is turned off, the boot capacitor Cbs3 is charged by the power supply Vsup via the diode Dsp3 of the driver IC 23A, and when the switching device Q4 is turned on and the switching devices S2 and Q3 are turned off, the boot capacitor Cbs4 is charged by the boot capacitor Cbs3 via the boot diode Db2. In one embodiment, a capacitor Csp3 is coupled between the power supply pin VCC of the driver 23A and the reference ground, a capacitor Csp4 is coupled between the power supply pin VCC of the driver 24A and the reference ground. In one embodiment, a capacitance of the capacitor Csp3 is larger than a capacitance of the boot capacitor Cbs3, and the capacitance of the boot capacitor Cbs3 is larger than a capacitance of the boot capacitor Cbs4.

Figure 6:
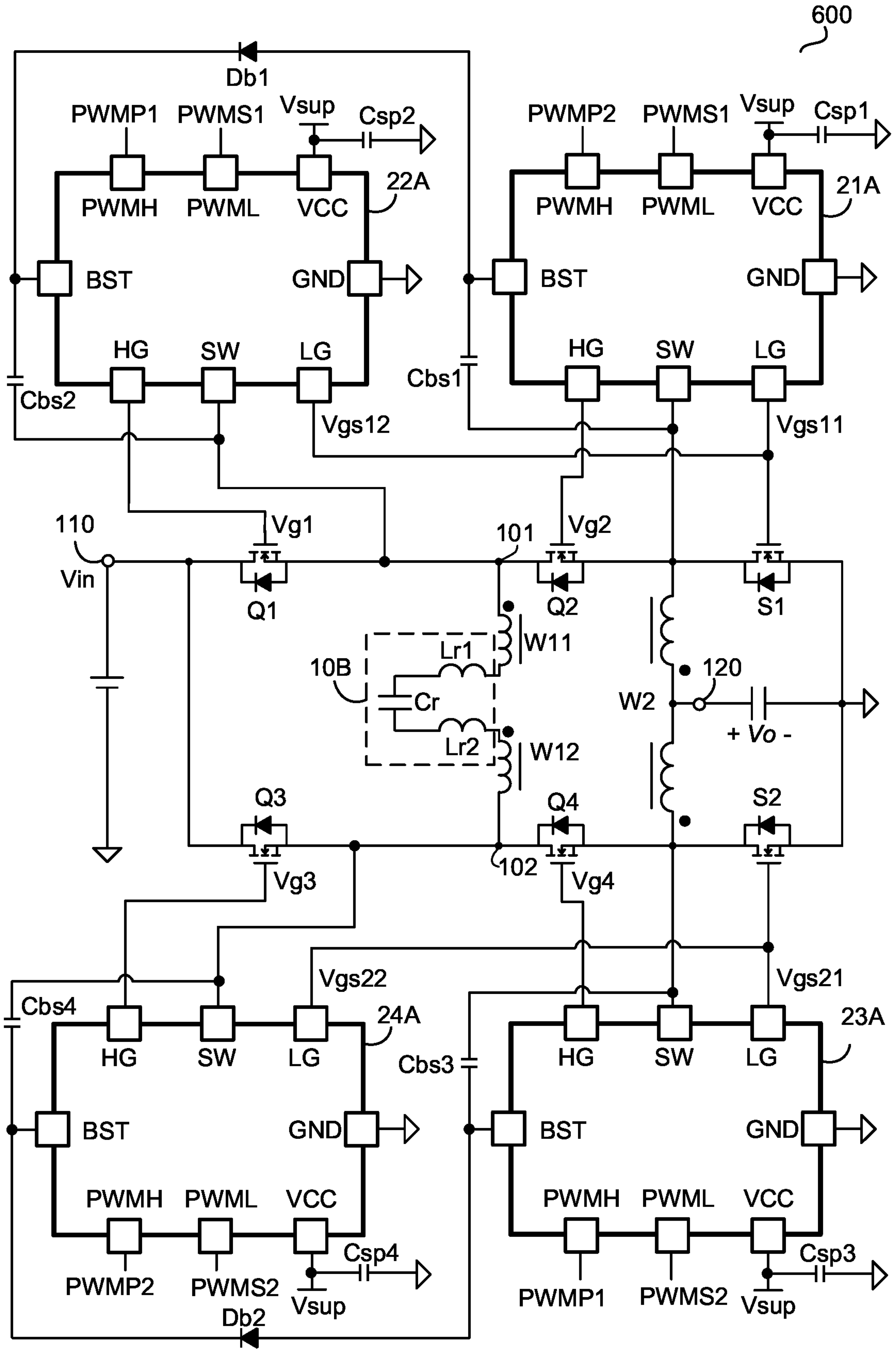
FIG. 6 schematically illustrates a non-isolated resonant switching converter 600 in accordance with an embodiment of the present invention.

FIG. 6 schematically illustrates a non-isolated resonant switching converter 600 in accordance with an embodiment of the present invention. As shown in FIG. 6, the resonant tank 10B comprises the resonant capacitor Cr, a resonant inductor Lr1, and a resonant inductor Lr2 coupled in series between the resonant tank 101 and the resonant 102. In one embodiment, the resonant inductor Lr1 is a leakage inductor of a primary winding W11, and the resonant inductor Lr2 is a leakage inductor of a primary winding W12. The non-isolated resonant switching converter 400 further comprises driver ICs 21A-24A. Driver ICs 21A-22A are employed to drive the switching devices Q1, Q2, and S1, and driver ICs 23A-24A are employed to drive the switching devices Q3, Q4, and S2.

Figure 7:
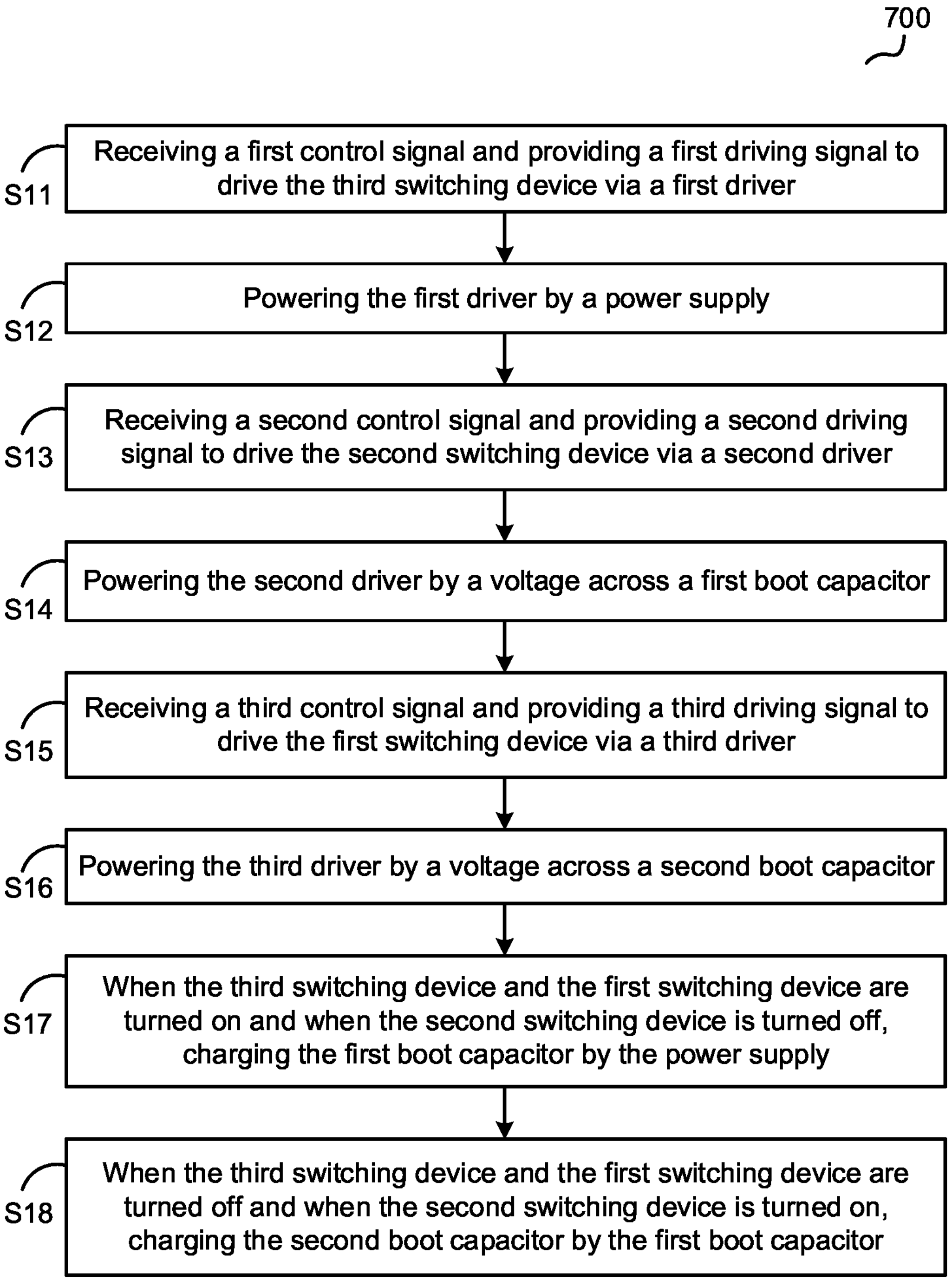
FIG. 7 illustrates a driving method 700 in accordance with an embodiment of the present invention.

FIG. 7 illustrates a driving method 700 in accordance with an embodiment of the present invention. The driving method 700 is for driving a first switching device, a second switching device and a third switching device coupled in series between an input voltage and a reference ground, wherein the first switching device is coupled to the input voltage, the third switching device is coupled to the reference ground, and the second switching device is coupled between the first switching device and the third switching device. The driving method 700 has steps S11-S18.

At the step S11, receiving a first control signal and providing a first driving signal to drive the third switching device via a first driver.

At the step S12, powering the first driver by a power supply.

At the step S13, receiving a second control signal and providing a second driving signal to drive the second switching device via a second driver.

At the step S14, powering the second driver by a voltage across a first boot capacitor.

At the step S15, receiving a third control signal and providing a third driving signal to drive the first switching device via a third driver.

At the step S16, powering the third driver by a voltage across a second boot capacitor.

At the step S17, when the third switching device and the first switching device are turned on and when the second switching device is turned off, charging the first boot capacitor by the power supply.

At the step S18, when the third switching device and the first switching device are turned off and when the second switching device is turned on, charging the second boot capacitor by the first boot capacitor. In one embodiment, a capacitance of the first boot capacitor is larger than a capacitance of the second boot capacitor. In one embodiment, a maximum voltage of the first driving signal is higher than a maximum voltage of the second driving signal, and the maximum voltage of the second driving signal is higher than a maximum voltage of the third driving signal. In one embodiment, a charging current is capable of flowing through the first boot capacitor, a boot diode, the second boot capacitor and the second switching device, to charging the second boot capacitor.

In one embodiment, the driving method 700 further comprising providing a fourth driving signal based on the first control signal via a fourth driver, to drive the third switching device together with the first driving signal, and powering the fourth driver by the power supply. In one embodiment, a maximum voltage of the fourth driving signal is higher than the maximum voltage of the second driving signal.

Note that in the driving method 700 described above, the box functions may also be implemented with different order as shown in FIG. 7. Two successive box functions may be executed meanwhile, or sometimes the box functions may be executed in a reverse order.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

We claim:

1. A non-isolated resonant switching converter, comprising:

an input node, configured to receive an input voltage;

an output node, configured to provide an output voltage;

a transformer, having a primary winding and a secondary winding;

a resonant tank, comprising a resonant capacitor and a resonant inductor coupled in series between a first tank node and a second tank node, wherein the resonant inductor is formed by the primary winding;

a first switching device, coupled between the input node and the first tank node;

a second switching device, coupled between the first tank node and the secondary winding;

a third switching device, coupled between the secondary winding and a reference ground;

a first driver integrated circuit (IC) having a first driver and a second driver, the first driver is configured to provide a first driving signal based on a first control signal to drive the third switching device, the second driver is configured to provide a second driving signal based on a second control signal to drive the second switching device, the first driver is configured to be powered by a power supply and the second driver is configured to be powered by a voltage across a first boot capacitor; and a second driver IC having a third driver, the third driver is configured to provide a third driving signal based on a third control signal to drive the first switching device, and the third driver is configured to be powered by a voltage across a second boot capacitor; wherein the second driver IC further comprises:

a fourth driver configured to receive the first control signal and provide a fourth driving signal based on the first control signal, and the fourth driver is configured to be powered by the power supply; wherein the fourth driving signal is capable of driving the third switching device together with the first driving signal.

2. The non-isolated resonant switching converter of claim 1, wherein a capacitance of the first boot capacitor is larger than a capacitance of the second boot capacitor.

3. The non-isolated resonant switching converter of claim 1, wherein a maximum voltage of the first driving signal is higher than a maximum voltage of the second driving signal, and the maximum voltage of the second driving signal is higher than a maximum voltage of the third driving signal.

4. The non-isolated resonant switching converter of claim 1, wherein a first charging current is capable of flowing from the power supply to charge the first boot capacitor.

5. The non-isolated resonant switching converter of claim 1, wherein a second charging current is capable of flowing from a first terminal of the first boot capacitor to charge the second boot capacitor, through a boot diode.

6. The non-isolated resonant switching converter of claim 5, wherein the second charging current is capable of returning to a second terminal of the first boot capacitor via the second switching device.

7. The non-isolated resonant switching converter of claim 1, further comprising:

a fourth switching device, coupled between the input node and the second tank node;

a fifth switching device, coupled between the second tank node and the secondary winding;

a sixth switching device, coupled between the secondary winding and the reference ground;

a third driver IC, having a fifth driver and a sixth driver, the fifth driver is configured to provide a fifth driving signal based on a fourth control signal to drive the sixth switching device, the sixth driver is configured to provide a sixth driving signal based on the third control signal to drive the fifth switching device, such that the fifth switching device is turned on and off simultaneously with the first switching device, the fifth driver is configured to be powered by the power supply, and the sixth driver is configured to be powered by a voltage across a third boot capacitor; and a fourth driver IC, having a seventh driver and an eighth driver, the seventh driver is configured to provide a seventh driving signal based on the second control signal to drive the fourth switching device, such that the fourth switching device is turned on and off simultaneously with the second switching device, the eighth driver is configured to provide a eighth driving signal based on the fourth control signal, the seventh driver is configured to be powered by a voltage across a fourth boot capacitor, and the eighth driver is configured to be powered by the power supply; wherein the eighth driving signal is capable of driving the sixth switching device together with the fifth driving signal;

when the sixth switching device and the fourth switching device are turned on and the fifth switching device is turned off, the third boot capacitor is charged by the power supply; and wherein when the sixth switching device and the fourth switching device are turned off and the fifth switching device is turned on, the fourth boot capacitor is charged by the third boot capacitor.

8. The non-isolated resonant switching converter of claim 7, wherein the secondary winding has a first terminal, a second terminal, and a center tap, a common node of the second switching device and the third switching device is coupled to the first terminal of the secondary winding, a common node of the fifth switching device and the sixth switching device is coupled to the second terminal of the secondary winding, and the output node is coupled to the center tap of the secondary winding.

9. A driving circuit for driving a first switching device, a second switching device and a third switching device coupled in series between an input voltage and a reference ground, the driving circuit comprising:

a first integrated circuit (IC) having a first driver and a second driver, wherein the first driver is configured to receive a first control signal via a first control input pin and provide a first driving signal via a first driving output pin to drive the third switching device, the second driver is configured to receive a second control signal via a second control input pin and provide a second driving signal via a second driving output pin to drive the second switching device; and a second IC having a third driver, wherein the third driver is configured to receive a third control signal via a third control input pin and provide a third driving signal via a third driving output pin to drive the first switching device; wherein the second IC further comprises:

a fourth driver configured to receive the first control signal via a fourth control input pin and provide a fourth driving signal via a fourth driving output pin based on the first control signal; wherein the fourth driving signal is capable of driving the third switching device together with the first driving signal.

10. The driving circuit of claim 9, wherein the first driver is configured to be powered by a power supply, and the second driver is configured to be powered by a voltage across a first boot capacitor; and the third driver is configured to be powered by a voltage across a second boot capacitor, and the fourth driver is configured to be powered by the power supply that powers the first driver.

11. The driving circuit of claim 10, wherein when the third switching device and the first switching device are turned on and the second switching device is turned off, the first boot capacitor is charged by the power supply.

12. The driving circuit of claim 10, wherein when the third switching device and the first switching device are turned off and the second switching device is turned on, the second boot capacitor is charged by the first boot capacitor.

13. The driving circuit of claim 10, wherein a capacitance of the first boot capacitor is larger than a capacitance of the second boot capacitor.

14. The driving circuit of claim 10, wherein the second boot capacitor is capable of being charged by the first boot capacitor via a charging current flowing from a first terminal of the first boot capacitor to the second boot capacitor through a diode, and the charging current is capable of returning to a second terminal of the first boot capacitor via the second switching device.

15. The driving circuit of claim 9, wherein the first IC further comprises a first bootstrap pin and the second IC further comprises a second bootstrap pin, the first bootstrap pin of the first IC is capable of coupling to the second bootstrap pin of the second IC through a diode, wherein an anode of the diode is coupled to the first bootstrap pin of the first IC, and a cathode of the diode is coupled to the second bootstrap pin of the second IC.

16. The driving circuit of claim 9, wherein a maximum voltage of the first driving signal is higher than a maximum voltage of the second driving signal, and the maximum voltage of the second driving signal is higher than a maximum voltage of the third driving signal.

17. The driving circuit of claim 9, wherein the first driving output pin of the first IC and the fourth driving output pin of the second IC are electrically connected together to a gate of the third switching device.

18. A driving method for driving a first switching device, a second switching device and a third switching device coupled in series between an input voltage and a reference ground, wherein the first switching device is coupled to the input voltage, the third switching device is coupled to the reference ground, and the second switching device is coupled between the first switching device and the third switching device, the driving method comprising:

receiving a first control signal and providing a first driving signal to drive the third switching device via a first driver;

powering the first driver by a power supply;

receiving a second control signal and providing a second driving signal to drive the second switching device via a second driver;

powering the second driver by a voltage across a first boot capacitor;

receiving a third control signal and providing a third driving signal to drive the first switching device via a third driver;

powering the third driver by a voltage across a second boot capacitor;

providing a fourth driving signal based on the first control signal via a fourth driver, to drive the third switching device together with the first driving signal; and powering the fourth driver by the power supply.

19. The driving method of claim 18, wherein a capacitance of the first boot capacitor is larger than a capacitance of the second boot capacitor.

20. The driving method of claim 18, wherein a maximum voltage of the first driving signal is higher than a maximum voltage of the second driving signal, and the maximum voltage of the second driving signal is higher than a maximum voltage of the third driving signal.

* * * * *